United States Patent [19]

Brinegar

[11] Patent Number: 4,524,337
[45] Date of Patent: Jun. 18, 1985

[54] VARIABLE AMPLITUDE DELAY EQUALIZER

[75] Inventor: Billy W. Brinegar, Roswell, Ga.

[73] Assignee: Scientific-Atlanta, Inc., Atlanta, Ga.

[21] Appl. No.: 512,592

[22] Filed: Jul. 11, 1983

[51] Int. Cl.³ .............................................. H03H 7/01
[52] U.S. Cl. .................................. 333/28 R; 333/112
[58] Field of Search ...................... 333/112, 119, 28 R

[56] References Cited

U.S. PATENT DOCUMENTS

| | | |
|---|---|---|
| 3,400,329 | 9/1968 | Cannon . |
| 3,706,947 | 12/1972 | Jedrychowski et al. ......... 333/28 R |
| 3,838,364 | 9/1974 | Kurokawa ........................ 333/28 R |
| 4,258,340 | 3/1981 | Ryu . |
| 4,333,063 | 6/1982 | Ryu et al. . |
| 4,352,190 | 9/1982 | Hullwegen . |

OTHER PUBLICATIONS

R. M. Kurzrok, *Amplitude Equalizer is Circulator Coupled*, Microwaves, 50–52 (Sep. 1971).
E. G. Cristal, *Theory and Design of Transmission Line All-Pass Equalizers*, IEEE Trans. Microwave Theory and Techniques, vol. MTT-17, No. 1, pp. 28-36 (Jan. 1969).
R. M. Kurzrok, *Comments on Loaded Q of a Waveguide Cavity Resonator*, IEEE Trans. Microwave Theory and Techniques, vol. MTT-15, pp. 192-193 (Mar. 1967).
E. N. Torgow, *Equalization of Waveguide Delay Distortion*, IEEE Trans. Microwave Theory and Techniques, vol. MTT-13, No. 6, pp. 756-762 (Nov. 1965).
E. J. Turvey, *Phase Equalizer Design Report*, Collins Radio Company, Report No. CER-T997 (Sep. 1960).

Primary Examiner—Paul Gensler
Attorney, Agent, or Firm—Kilpatrick & Cody

[57] ABSTRACT

A variable amplitude delay equalizer network comprising generally a 90° hybrid matrix consisting of toroidal transformer and two capacitors and having an input, an output and two reference ports. A reactive network at the first reference port forms a network which allows input energy to be shifted in phase and returned to the hybrid, thus providing envelope delay correction. An amplitude corrective network at the second port permits adjustment of the amplitude response essentially independent of envelope delay adjustment.

4 Claims, 2 Drawing Figures

VARIABLE AMPLITUDE DELAY EQUALIZER

BACKGROUND OF THE INVENTION

This invention relates to an electronic network utilized to compensate for nonlinear phase distortion created by other networks and circuitry. Such nonlinear phase distortion is typically created by networks such as filters, amplifiers, amplitude equalizers, FM modulators, FM demodulators and other analog and digital broadband communications devices.

Envelope delay distortion or group delay distortion has previously been corrected utilizing various networks such as different bridge T configurations derived from an allpass lattice structure. Reflective type equalizers, such as 90° hybrids and 180° hybrids have also been utilized. However, conventional equalizer networks have shared a common disadvantage: as the shape factor increases (greater envelope delay correction per unit of frequency bandwidth), the networks exhibit greater amplitude distortion due to the finite Q of the reactive elements used in implementation of the networks. Thus, while correcting for envelope delay distortion, a second distortion is introduced, which is amplitude distortion versus frequency.

Methods for measuring envelope delay are disclosed in U.S. Pat. No. 3,400,329 to Cannon together with amplitude and delay distortion correcting networks comprising cascaded frequency selective active corrective networks which separately correct a portion of the frequency band to be corrected. U.S. Pat. No. 4,258,340 to Ryu discloses an amplitude equalizer intended to have flat delay distortion characteristics comprising a pair of amplitude equalizers having complimentary, and thus cancelling, delay distortion characteristics. Such equalizers include delay circuits and/or phase shifters but do not teach or suggest correction of envelope delay distortion while avoiding amplitude distortion.

U.S. Pat. No. 4,333,063 to Ryu et al. discloses another amplitude equalizer for use within a predetermined frequency band, which equalizer is intended to exhibit no delay distortion. It utilizes combinations of signal splitters, delay circuitry and polarity and gain adjusting means. Additionally, U.S. Pat. No. 4,352,190 to Hullwegen discloses an automatic equalizer for data transmission and suggests a delay equalizer which includes an output amplitude stabilizer utilizing active network elements.

None of this art, however, or other art known to applicant discloses the simple and effective variable amplitude delay equalizer of the present invention.

SUMMARY OF THE INVENTION

The present invention corrects nonlinear phase distortion, also known as envelope delay distortion and normally referred to as $Td = d\theta/d\omega$, while maintaining a flat or corrective amplitude response.

The circuit of the present invention comprises generally a 90° hybrid matrix consisting of a toroidal transformer and two capacitors and having an input, an output and two reference ports, c and d. Reactive components at reference port c form a network which allows input energy to be shifted in phase and returned to the hybrid, thus forming an envelope delay corrective network. An amplitude corrective network comprising three resistors and a capacitor is connected to port d to permit adjustment of the amplitude response essentially independent of the envelope delay adjustment.

The present invention will achieve at least five times the envelope delay correction as conventional approaches without introducing amplitude distortion and can provide simultaneous envelope delay correction and amplitude correction.

DETAILED DESCRIPTION OF THE DRAWINGS

Figure 1:
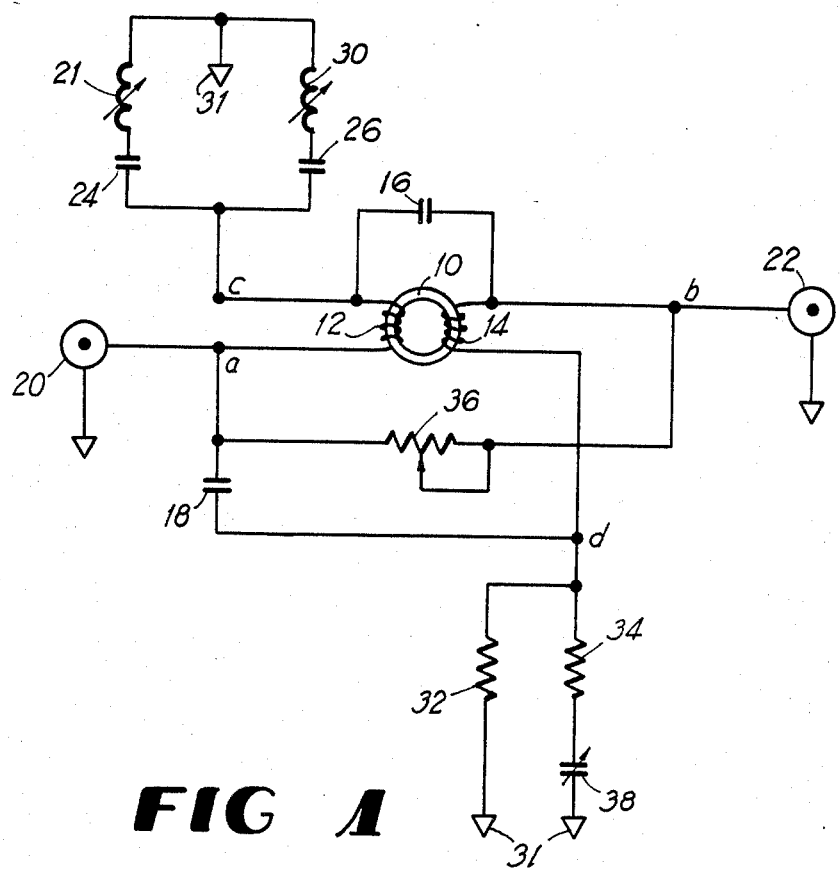
FIG. 1 is a schematic diagram of the preferred embodiment of the present invention.

FIG. 1 shows the preferred embodiment of the present invention comprising a 90° hybrid matrix formed by a toroidal transformer 10 having connections a and c to a first winding 12 and connections b and d to a second winding 14. A capacitor 16 is connected between toroidal transformer 10 connections c and b, and a capacitor 18 is connected between transformer 10 connections a and d. The hybrid matrix formed by transformer 10 and capacitors 16 and 18 has an input 20 at connection a and an output 22 at connection b. Connections c and d serve as reference ports.

A reactive network is connected to reference port c to allow energy from the input 20 to enter and return shifted in phase, thereby providing an envelope delay corrective network. The reference port c reactive network comprises a pair of capacitors 24 and 26 connected to reference port c, each of which connects in series to variable inductors 21 and 30, respectively, which inductors 21 and 30 connect to "ground" or a "common" connection 31.

An amplitude corrective network, which provides for amplitude distortionless envelope delay equalization in accordance with the present invention, comprises 3 resistors, 32, 34 and 36 and one variable capacitor 38. Variable resistor 36 is connected between transformer 10 connections a and b. Resistor 36 can be adjusted to vary the amplitude response, essentially independent of the delay adjustment achieved with the delay corrective network. Resistor 32 connects between reference port d and ground 31, and resistor 34 and variable capacitor 38 are in series between reference port d and ground 31. Centering of the amplitude peak or dip may be adjusted by variable capacitor 38.

The transformer 10 should be one with a low insertion loss, and at appropriate frequencies, such as in a network for use at 70 MHz, may be a bifilar wound toroid.

As will be appreciated by one skilled in the art, component values for the circuit of FIG. 1 may be chosen in accordance with conventional network design techniques for the desired frequency and other operating parameters.

Figure 2:
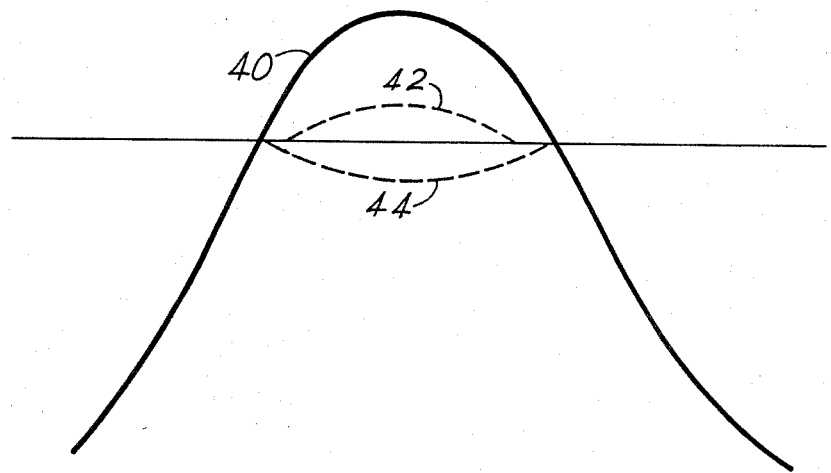
FIG. 2 is a simplified graphic presentation of the envelope delay correction and amplitude response, peak and dip centering adjustments possible in accordance with the present invention.

FIG. 2 is a graphic presentation of the envelope delay correction 40 which may be achieved by the present invention. The amplitude response adjustable by resistor 36 is indicated by broken line 42, and centering of the amplitude peak adjustable by capacitor 38 is indicated by broken line 44.

The foregoing description of the present invention is for purposes of explanation and illustration. The invention is not intended to be limited to the details of the embodiment or components described, but includes numerous modifications and changes, which will be apparent to those skilled in the relevant art, while still falling within the scope and spirit of the preceding description.

I claim:

1. An envelope delay distortion corrective network comprising:
   (a) a 90° hybrid matrix having an input, an output, a first reference port and a second reference port;
   (b) a reactive network connected to the first reference port to phase shift a signal applied to the matrix input; and
   (c) an RC network connected to the second reference port to provide amplitude correction for the signal at the matrix output, said RC network comprising a variable resistance between the input and output and a resistance in parallel with a series resistance and capacitance connected to the second reference port.

2. The corrective network of claim 1 wherein said reactive network comprises a parallel pair of series capacitances and inductances connected to the first reference port.

3. An envelope delay distortion corrective network comprising:
   (a) a 90° hybrid matrix having an input, an output, a first reference port and a second reference port;
   (b) a reactive network connected to the first reference port to phase shift a signal applied to the matrix input; and
   (c) an RC network comprising resistive and capacitive components connected to the second reference port to provide amplitude correction for the signal at the matrix output.

4. An envelope delay distortion corrective network comprising:
   (a) a toroidal transformer having an input winding with first and second connections and an output winding with first and second connections,
   (b) a first capacitance between the input second connection and output first connection,
   (c) a second capacitance and first inductance in series between the input second connection and a common connection,
   (d) a third capacitance and second inductance in series between the input second connection and the common connection,
   (e) a variable resistance between the input first connection and the output first connection,
   (f) a fourth capacitance between the input first connection and the output second connection,
   (g) a fixed resistance between the output second connection and the common connection, and
   (h) a second fixed resistance and a fifth capacitance in series between the output second connection and the common connection.

* * * * *